US009338575B2

(12) United States Patent
Mitra et al.

(10) Patent No.: US 9,338,575 B2
(45) Date of Patent: May 10, 2016

(54) IMAGE STEERED MICROPHONE ARRAY

(71) Applicant: EchoStar Technologies L.L.C., Englewood, CO (US)

(72) Inventors: Shounak Mitra, Englewood, CO (US); Fred Earl Starks, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 130 days.

(21) Appl. No.: 14/183,568

(22) Filed: Feb. 19, 2014

(65) Prior Publication Data

US 2015/0237455 A1 Aug. 20, 2015

(51) Int. Cl.
*H04R 3/00* (2006.01)
*H04S 7/00* (2006.01)
*H04N 7/18* (2006.01)

(52) U.S. Cl.
CPC *H04S 7/30* (2013.01); *H04N 7/183* (2013.01); *H04R 3/00* (2013.01)

(58) Field of Classification Search
None
See application file for complete search history.

(56) References Cited

U.S. PATENT DOCUMENTS

| 5,940,118 A | 8/1999 | Van Schyndel |
| 2005/0111674 A1 | 5/2005 | Hsu |
| 2007/0116300 A1* | 5/2007 | Chen ........................ H04M 1/03 381/92 |
| 2010/0110232 A1 | 5/2010 | Zhang |
| 2012/0155703 A1 | 6/2012 | Hernandez-Abrego |
| 2014/0006026 A1* | 1/2014 | Lamb et al. ................... 704/246 |

FOREIGN PATENT DOCUMENTS

WO 0123104 A2 4/2001

OTHER PUBLICATIONS

International Search Report for PCT/US2015/013640 dated May 7, 2015 (12 pages).
Cutler R et al: "Look who's talking: speaker detection using video and audio correlation", Multimedia and Expo, 2000, ICME 2000, 2000 IEEE International Conference on New York NY , USA Jul. 30-Aug. 2, 2000, Piscataway, NJ, USA, IEEE, US vol. 3, Jul. 30, 2000, pp. 1589-1592, XP002238656, DOI: 10.1109/ICME.2000.871073; ISBN: 978-0-7803-6536-0.
Hamid Izadinia et al: "Multimodal Analysis for Indentification and Segmentation of Moving-Sounding Objects", IEEEE Transactions on Multimedia, IEEE Service Center, Piscataway, NJ, US, vol. 15, No. 2, Feb. 1, 2013, pp. 378-390, XP011487693, ISSN: 1520-9210, DOI: 10.1109/TMM.2012.2228476.

* cited by examiner

*Primary Examiner* — Regina N Holder
(74) *Attorney, Agent, or Firm* — Bejin Bieneman PLC

(57) ABSTRACT

A system includes a microphone array having a plurality of microphones. The system further includes a camera configured to capture stream video and a processing device configured to steer the microphone array based at least in part on the video acquired by the camera. A method includes receiving video captured by a camera, processing the video, and steering a microphone array using signal processing where the steering direction is defined by the processed video.

19 Claims, 4 Drawing Sheets

IMAGE STEERED MICROPHONE ARRAY

BACKGROUND

Microphone arrays typically include multiple microphones strategically arranged spatially. Each of the microphones in the array are of the same characteristics, e.g., directionality, sensitivity, etc. Types of microphones that can be used in arrays include omnidirectional microphones, unidirectional microphones, cardioid microphones, and shotgun microphones. Each of these types of microphone is designed to capture sounds from different directions according to polar patterns relative to the orientation of the microphone. Each microphone in the array is connected to an acoustic signal processor effectively making the array behave as a single microphone with a dynamically configurable polar pattern different than the polar pattern inherent of an individual microphone in the array. This way, the microphone array is "steered" by changing its effective polar pattern to point to the desired sound source, not steered by physical motion of the array or microphones within the array.

DETAILED DESCRIPTION

An exemplary system includes a microphone array having a plurality of microphones. The exemplary system further includes a camera configured to capture an image and a processing device configured to steer the microphone array based at least in part on the image captured by the camera. An exemplary method includes receiving an image captured by a camera, processing the image, and steering a microphone array according to the captured image. Accordingly, the microphone array is automatically steered to follow a sound source, such as a person speaking, without much, if any, human interaction.

The system shown in the FIGS. May take many different forms and include multiple and/or alternate components and facilities. While an exemplary system is shown, the exemplary components illustrated are not intended to be limiting. Indeed, additional or alternative components and/or implementations may be used.

Figure 1:
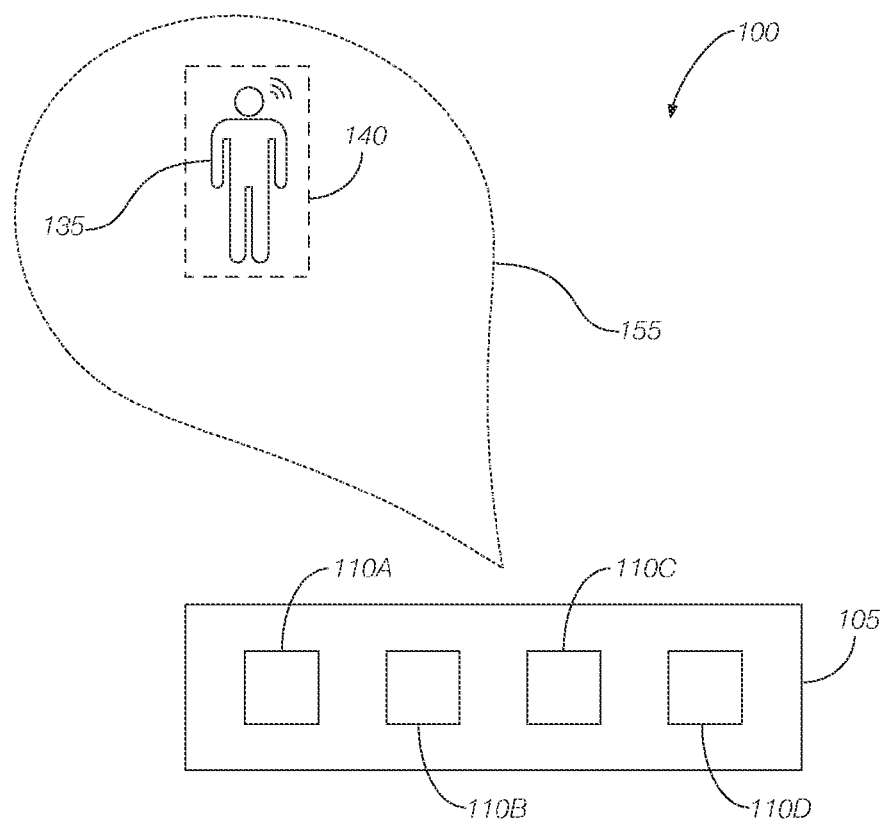
FIG. 1 illustrates an exemplary system for steering a microphone array toward a sound source located at a first position.
Figure 1:
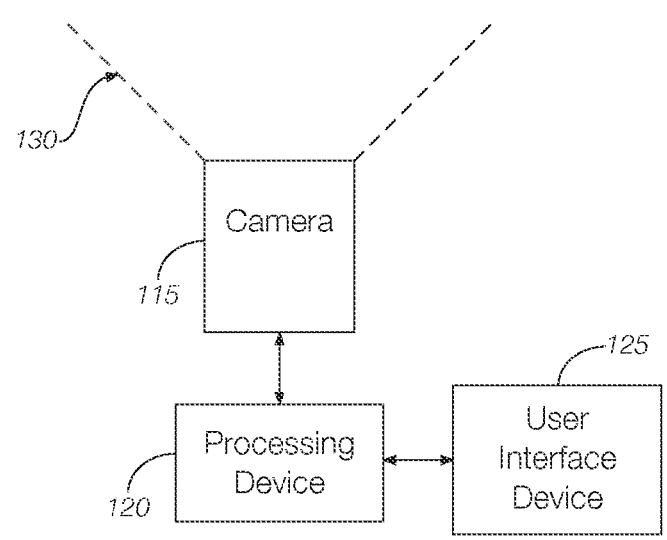

As illustrated in FIG. 1, the system 100 includes a microphone array 105, a camera 115, and a processing device 120. One or more components of the system 100 may be discrete relative to the others, or in some possible approaches, the system 100 may be incorporated into a single device such as a set-top box, a gaming console, a computer, a home automation system 100, a mobile device such as a tablet computer or mobile phone, etc. Moreover, the system 100 may be used in a number of different environments including, but not limited to, a home, business, conference room, theater, auditorium, vehicle, place of worship, arena, park, or a studio.

Figure 2:
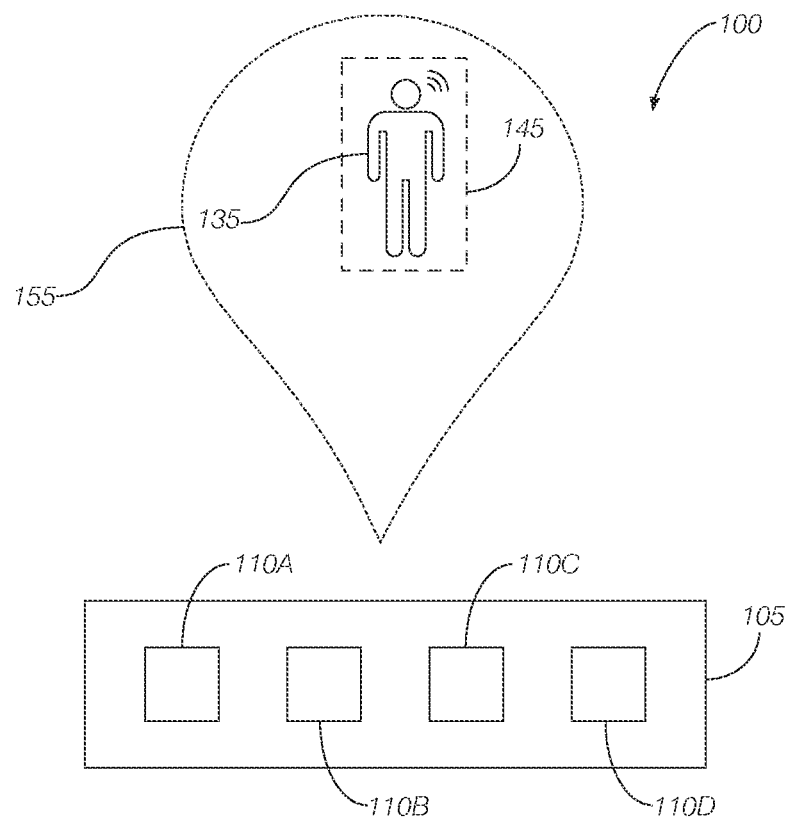
FIG. 2 illustrates the exemplary system of FIG. 1 with the sound source located at a second position.
Figure 2:
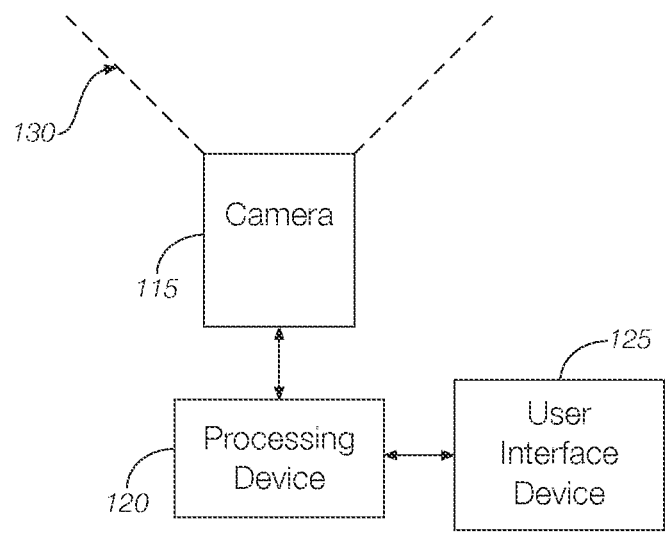
Figure 3:
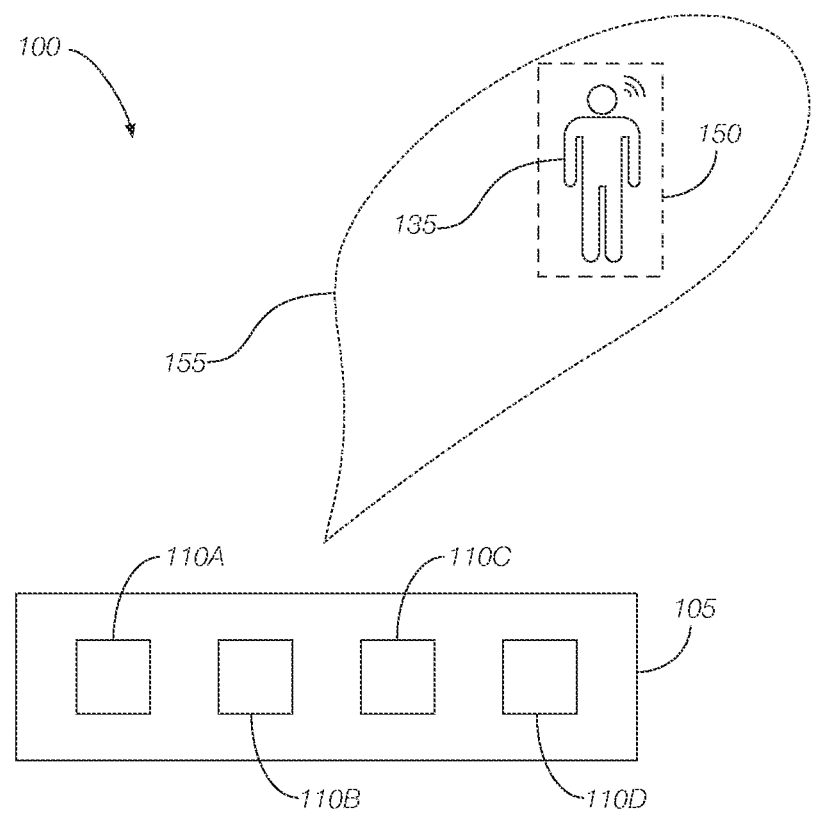
FIG. 3 illustrates the exemplary system of FIGS. 1 and 2 with the sound source located at a third position.
Figure 3:
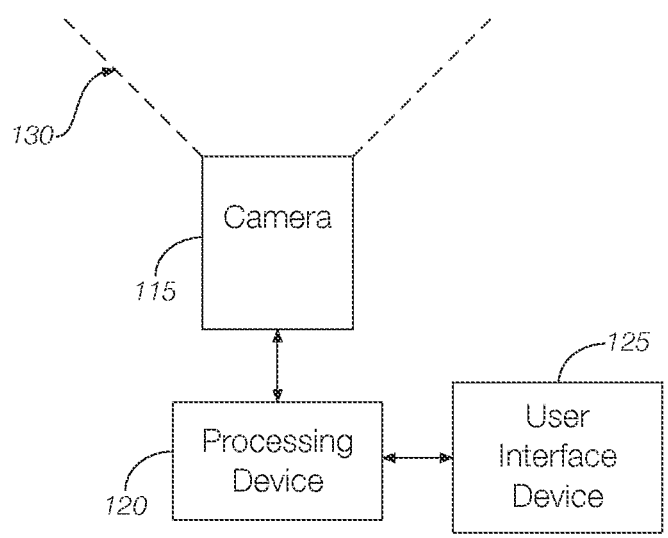

The microphone array 105 may include at least two microphones 110. For purposes of clarity, only four microphones 110 are shown in FIGS. 1-3. The microphone array 105 may include any number of microphones 110. Configuration of the array may be based on various design considerations such as expected distance of the sound source to the array, field of view of the array, polar patterns of the microphones, etc.

The camera 115 may be configured to electronically capture images in real time. The camera 115 may be configured to output signals representing the images captured. In one possible approach, the camera 115 may include an infrared sensor for, e.g., detecting people. The signals generated by the camera 115 may be output to a user interface device 125 that includes, e.g., a display screen configured to present the image. The camera 115 may capture images within a predetermined field of view 130 that may be defined by a size of a camera lens. The field of view 130 may be further or alternatively defined by whether the camera 115 is able to move. For example, rotating the camera 115 about a fixed pivot point, rolling the camera 115 along a track or cable, or otherwise changing a direction where the camera 115 is pointed and/or changing a distance between the camera 115 and a focal point may change the field of view 130. The movement of the camera 115 may be controlled by another component, such as the processing device 120.

The processing device 120 may be configured to steer the microphone array 105 according to phased array acoustical processing techniques and control at least some operations of the camera 115. In some possible implementations, the processing device 120 may be configured to receive signals generated by the camera 115, process the signals, and steer the microphone array 105 based on the images and/or video captured by the camera 115. For instance, the processing device 120 may process the images and/or video using a pattern recognition technique to identify and track a sound source. The processing device 120 may further perform acoustic signal processing of the signals from the microphone array 105 to dynamically modify an effective polar pattern of the array 105. Moreover, the processing device 120 may adjust the effective polar pattern based at least in part on a location of the sound source 135 determined from the processed video. Using one or more pattern recognition techniques, the processing device 120 may be configured to identify at least one sound source 135, such as a person speaking, from the images captured by the camera 115, and selectively steer the array 105 based on a location of the sound source 135 relative to the microphone array 105. One alternative to a pattern recognition technique may include using an infrared camera, as mentioned above, to identify one or more sound sources 135. In some possible approaches, the processing device 120 may further selectively steer the microphone array 105 according to a direction the sound sources 135 is looking. The processing device 120 may determine the location of the sound source 135 based on a location of the sound source 135 within the image. That is, the processing device 120 may be configured to compare the location of the sound source 135 in the image to a reference point and selectively steer the array 105 accordingly.

If the sound source 135 is moving relative to the microphone array 105, the processing device 120 may be configured to output a control signal to control the direction of the camera 115 to follow the sound source 135. Thus, the processing device 120 may be configured to move the camera 115 so that the sound source 135 remains in the field of view 130. To move the camera 115, the processing device 120 may output the control signal to a motor (not shown) that can cause the camera 115 to rotate, slide, roll, or otherwise change direction and/or move closer to or farther away from the sound source 135. In some instances, the processing device 120 may be configured to determine the location of the sound source 135 based on the movement of the camera 115. For example, if the direction of the camera 115 changes to follow the movement of the sound source 135, which may occur if the direction of the camera 115 is controlled to keep the sound source 135 near a center of the frame of view, the processing device 120 may determine the location of the sound source 135 relative to an angular displacement of the camera 115 relative to a reference point.

In instances where multiple sound sources 135 are within the field of view 130, the processing device 120 may be configured to select one of the sound sources 135 as having priority over the others and steer the microphone array 105 toward the sound source 135 with the highest priority. Moreover, the processing device 120 may be configured to control the movement of the camera 115 to follow the sound source 135 with the highest priority. The processing device 120 may identify the multiple sound sources 135 from the pattern recognition technique performed on the images captured by the camera 115 and determine the priority of each sound source 135 based upon a predetermined setting or a user input provided via the user interface device 125 having, e.g., an input device such as a keyboard or touchscreen. In some implementations, the processing device 120 may determine that any sound source 135 that is currently producing a sound has a higher priority than any sound source 135 that is not currently producing a sound. Thus, the processing device 120 may be configured to assign the highest priority to multiple sound sources 135 and steer the microphone array 105 toward those sound sources 135 that are simultaneously producing a sound.

FIGS. 1-3 illustrate sound sources 135 (e.g., a person) at different locations relative to the microphone array 105. While only four microphones 110 are shown, the microphone array 105 may include any number of microphones 110. In FIG. 1, the sound source 135 is in a first location 140 closest to microphone 110A. Thus, the processing device 120 may steer the microphone array 105 in a way that configures the array's 105 effective main lobe 155 of its polar pattern to point to the sound source. In FIG. 2, the sound source 135 has moved to a second location 145. Therefore, the processing device 120 may steer the microphone array 105 by reconfiguring the array's effective main lobe 155 of its polar pattern to point to the sound source's new location. Referring now to FIG. 3, the sound source 135 has moved to a third location. Accordingly, the processing device 120 again reconfigures the array's effective main lobe 155 of its polar pattern to point to the sound source's new location.

In general, computing systems and/or devices, such as the processing device 120, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 4:
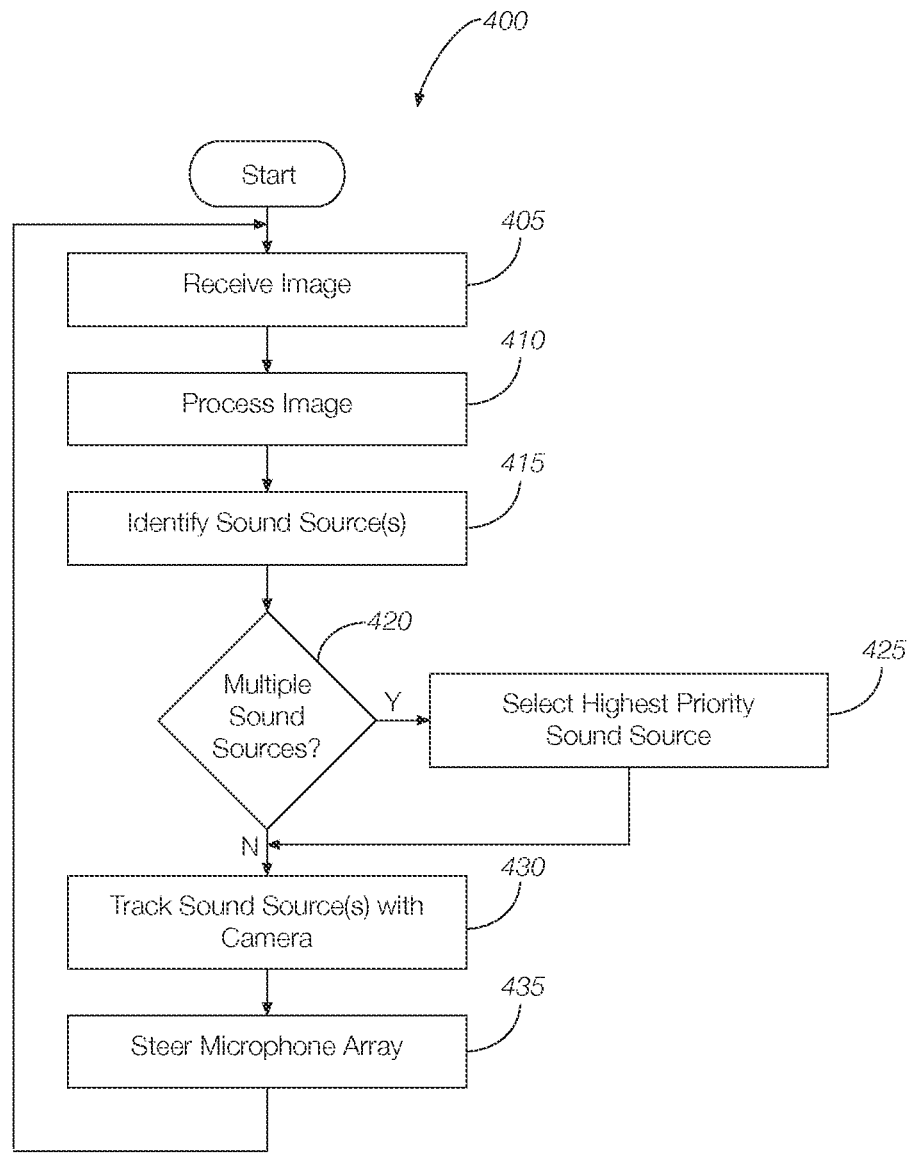
FIG. 4 is a flowchart of an exemplary process that may be implemented by the system of FIGS. 1-3 to steer the microphone array toward the sound source according to an image captured by a camera.

FIG. 4 illustrates a flowchart of an exemplary process 400 that may be implemented by the system 100 of FIGS. 1-3. For instance, in some possible approaches, the process 400 may be executed by the processing device 120.

At block 405, the processing device 120 may receive an image captured by the camera 115. The camera 115 may capture the images in real time and output signals representing the images captured. The images may be limited to a field of view 130 of the camera 115.

At block 410, the processing device 120 may process the image received at block 405. Processing the image may include using pattern recognition techniques to identify one or more sound sources 135 located in the image. One alternative to pattern recognition may include using infrared to detect whether any sound sources 135 are located in the image.

At block 415, the processing device 120 may identify one or more sound sources 135 in the image. The sound sources 135 may be identified based on, e.g., the pattern recognition or infrared processing performed at block 410. If no sound sources 135 are found, the processing device 120 may adjust the field of view 130 of the camera 115 until at least one sound source 135 is found.

At block 420, the processing device 120 may determine whether multiple sound sources 135 are present in the field of view 130 of the camera 115. If so, the process 400 may continue at block 425. If only one sound source 135 is present, the process 400 may continue at block 430.

At block 425, the processing device 120 may determine which sound source 135 takes priority. As discussed above, it may be possible for multiple sound sources 135 to share priority over at least one other sound source 135, or for a single sound source 135 to take priority over all other sound sources 135.

At block 430, the processing device 120 may track the sound source 135 with the camera 115. For example, the processing device 120 may output one or more control signals to adjust the direction of the camera 115 to keep the sound source 135 within the field of view 130, if possible. In the instance where multiple sound sources 135 are present, the processing device 120 may track the sound source 135 or sound sources 135 with the highest priority, which may include allowing other sound sources 135 to fall out of the field of view 130 of the camera 115.

At block 435, the processing device 120 may steer the microphone array 105 according to the acquired images, and in particular, the location of the sound source 135 in the captured images relative to the microphone array 105. Steering the microphone array 105 may include adjusting a polar pattern of the main lobe of the microphone array 105 toward the sound source. The processing device 120 may steer the microphone array 105 based on the location of the sound source 135 relative to the microphone array 105, which as discussed above, may be determined from the position of the sound source 135 in the images relative to a reference point, the angular displacement of the direction of the camera 115, or the like. Moreover, the microphone array 105 may be steered to follow the one or more sound sources 135 that take higher priority over the other sound sources 135, if any.

The process 400 may end after block 435, or in some instances, the process 400 may return to block 405.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
a microphone array including a plurality of microphones;
a camera configured to capture an image with a plurality of sound sources; and
a processing device configured to receive at least one user input representing a priority of at least one of the plurality of sound sources, assign the priority to at least one of the plurality of sound sources in accordance with the user input, and steer the microphone array toward the sound source with a highest priority based at least in part on the image captured by the camera and in accordance with the user input.

2. The system of claim 1, wherein the processing device is configured to steer the microphone array according to at least one phased array acoustical processing technique.

3. The system of claim 1, wherein the processing device is configured to steer the microphone array by adjusting a main lobe of a polar pattern of the microphone array toward a sound source.

4. The system of claim 1, wherein the processing device is configured to process the image using a pattern recognition technique.

5. The system of claim 4, wherein the processing device is configured to identify at least one of the plurality of sound sources based at least in part on the processed image.

6. The system of claim 5, wherein the processing device is configured to output a control signal to control a direction of the camera in accordance with a location of the sound source with the highest priority.

7. The system of claim 4, wherein the processing device is configured to identify another of the plurality of sound sources based at least in part on the processed image.

8. The system of claim 7, wherein the processing device is configured to steer the microphone array based at least in part on a location of at least one of the plurality of sound sources and the priorities of each of the plurality of sound sources.

9. The system of claim 7, wherein the processing device is configured to determine whether at least one of the sound sources is producing a sound and steer the microphone array toward the sound source with the highest priority that is producing a sound.

10. A method comprising:
receiving an image captured by a camera, the image including a plurality of sound sources;
processing the image;
receiving at least one user input representing a priority of at least one of the plurality of sound sources;

assigning the priority to at least one of the plurality of sound sources in accordance with the at least one user input; and steering a microphone array toward the sound source with a highest priority included in the captured image and in accordance with the user input, the microphone array including a plurality of microphones.

11. The method of claim 10, wherein steering the microphone array includes adjusting a main lobe of a polar pattern of the microphone array toward the sound source with the highest priority.

12. The method of claim 10, wherein steering the microphone array includes steering the microphone array according to at least one phased array acoustical processing technique.

13. The method of claim 10, wherein the image is processed using a pattern recognition technique.

14. The method of claim 10, further comprising identifying at least one sound source among the plurality of sound sources based at least in part on the processed image.

15. The method of claim 10, further comprising tracking a location of the the sound source with the highest priority.

16. The method of claim 15, wherein tracking the location includes outputting a control signal to control a direction of the camera in accordance with the location of the sound source with the highest priority.

17. The method of claim 15, wherein steering the microphone array is based at least in part on a location of the sound source with the highest priority.

18. The method of claim 17, wherein the microphone array is steered the sound source with the highest priority that is producing sound.

19. A set top box comprising:
a microphone array including a plurality of microphones;
a camera configured to acquire video including a plurality of sound sources; and
a processing device configured to:
    process the video using a pattern recognition technique to identify and track at least one of the plurality of sound sources;
    receive at least one user input representing a priority of at least one of the plurality of sound sources;
    assign the priority to at least one of the plurality of sound sources in accordance with the user input;
    perform acoustic signal processing of the signals from the microphone array to dynamically modify an effective polar pattern of the array; and
    adjust the effective polar pattern based at least in part on a location of the sound source determined from the processed video, wherein the effective polar pattern is steered toward the sound source with a highest priority in accordance with the user input.

* * * * *